(12) United States Patent
Muller et al.

(10) Patent No.: US 9,418,156 B2
(45) Date of Patent: Aug. 16, 2016

(54) PROVIDING LOCAL DATA WITH SEARCH RESULTS

(75) Inventors: James Robert Muller, Palo Alto, CA (US); Qingzhao Tan, San Jose, CA (US)

(73) Assignee: Google Inc., Mountain View, CA (US)

( * ) Notice: Subject to any disclaimer, the term of this patent is extended or adjusted under 35 U.S.C. 154(b) by 772 days.

(21) Appl. No.: 13/572,509

(22) Filed: Aug. 10, 2012

(65) Prior Publication Data

US 2015/0169789 A1 Jun. 18, 2015

(51) Int. Cl.
*G06F 7/00* (2006.01)
*G06F 17/30* (2006.01)

(52) U.S. Cl.
CPC .... *G06F 17/30864* (2013.01); *G06F 17/30554* (2013.01); *G06F 17/30867* (2013.01)

(58) Field of Classification Search
CPC ............... G06F 17/30554; G06F 17/30864; G06F 17/30867
USPC ......................................................... 707/722
See application file for complete search history.

(56) References Cited

U.S. PATENT DOCUMENTS

| | | | |
|---|---|---|---|
| 5,802,493 A * | 9/1998 | Sheflott et al. ................. | 705/1.1 |
| 5,842,195 A * | 11/1998 | Peters et al. | |
| 5,893,098 A * | 4/1999 | Peters et al. | |
| 6,148,289 A | 11/2000 | Virdy | |
| 7,403,939 B1 | 7/2008 | Virdy | |
| 7,483,881 B2 * | 1/2009 | Egnor et al. | |
| 7,774,342 B1 | 8/2010 | Virdy | |
| 8,166,025 B1 | 4/2012 | Virdy | |
| 8,195,654 B1 * | 6/2012 | Riley et al. ..................... | 707/726 |
| 8,392,394 B1 * | 3/2013 | Kumar ............. | G06F 17/30864 707/706 |
| 8,504,437 B1 * | 8/2013 | Agarwal et al. ............... | 705/26.3 |
| 8,655,866 B1 * | 2/2014 | Provine et al. ................ | 707/713 |
| 8,676,828 B1 * | 3/2014 | Agarwal et al. ............... | 707/767 |
| 2005/0065916 A1 * | 3/2005 | Ge et al. ............................ | 707/3 |
| 2005/0065959 A1 * | 3/2005 | Smith et al. .................... | 707/102 |
| 2005/0288941 A1 * | 12/2005 | DuBois ............... | G06Q 30/018 705/317 |
| 2006/0149800 A1 * | 7/2006 | Egnor et al. ................... | 707/205 |
| 2007/0038628 A1 * | 2/2007 | Eckert et al. ...................... | 707/9 |
| 2007/0118520 A1 * | 5/2007 | Bliss et al. ......................... | 707/5 |
| 2007/0168335 A1 * | 7/2007 | Moore ............. | G06F 17/30864 |
| 2009/0327078 A1 * | 12/2009 | Ohazama et al. .......... | 705/14.54 |
| 2010/0306249 A1 * | 12/2010 | Hill et al. ....................... | 707/769 |
| 2012/0005016 A1 * | 1/2012 | Graff ................. | G06Q 30/0242 705/14.49 |
| 2012/0005023 A1 * | 1/2012 | Graff ................. | G06Q 30/0201 705/14.58 |
| 2012/0209836 A1 | 8/2012 | Virdy | |
| 2015/0193819 A1 * | 7/2015 | Chang ................ | G06Q 10/1095 705/7.19 |

* cited by examiner

*Primary Examiner* — Mark E Hershley
(74) *Attorney, Agent, or Firm* — Fish & Richardson P.C.

(57) ABSTRACT

Methods, systems, and apparatus, including computer programs encoded on computer storage media, for providing local data with search results. One of the methods includes obtaining a plurality of documents responsive to a query; determining that a first document of the plurality of documents is associated with at least one business; determining that the first document is a candidate local document in response to the determining; in response to determining that the first document is a candidate local document, verifying that the first document is a local document, the verifying based on one or more second documents of the plurality of documents; and in response to verifying that the first document is a local document, providing local data associated with the first document.

17 Claims, 3 Drawing Sheets

PROVIDING LOCAL DATA WITH SEARCH RESULTS

BACKGROUND

This specification relates generally to providing search results in response to search queries.

A search engine or personal assistant device receives queries, for example, from one or more users and returns query results responsive to the queries. For example, the search engine or personal assistant device can identify documents responsive to a query, generate query results with information about the documents, and provide the query results in response to the query. Other types of query results, for example, direct answers to questions posed by the user, or a summary of information responsive to the user's query, can also be provided. The usefulness of a search engine or personal assistant device can depend on its ability to provide satisfactory query results.

SUMMARY

This specification describes technologies relating to verifying candidate local documents and providing local data associated with verified local documents.

In general, one innovative aspect of the subject matter described in this specification can be embodied in methods that include the actions of obtaining, by one or more computers, a plurality of documents responsive to a query; determining, by one or more computers, that a first document of the plurality of documents is associated with at least one business; determining, by one or more computers, that the first document is a candidate local document in response to the determining; in response to determining that the first document is a candidate local document, verifying, by one or more computers, that the first document is a local document, the verifying based on one or more second documents of the plurality of documents; and in response to verifying that the first document is a local document, providing, by one or more computers, local data associated with the first document. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination.

Providing local data can include presenting the local data in an answer box, wherein the answer box includes text describing the local data associated with the first document. The local data can include an address of a business associated with the first document. The methods can further include the actions of receiving a user interaction with the presented answer box; and causing the answer box to display a map of the address of the business in response to receiving the user interaction.

Determining that the first document is a candidate local document can include identifying that the first document is associated with only one business.

Determining that the first document is a candidate local document can include identifying that the first document is associated with an authority business or a topical business.

Determining that the first document is a candidate local document can include identifying that the first document is associated with a business that is a chain store; and determining that an address associated with the chain store is within a predetermined distance from a current user location.

Verifying that the first document is a local document can include identifying a first predetermined number of second documents that reference the first document. The second documents that reference the first document can be identified from a second predetermined number of documents of the plurality of documents that are most responsive to the query.

The subject matter described in this specification can be implemented in particular embodiments so as to realize one or more of the following advantages. The performance of existing search systems can be improved. For example, search results for a query can be verified as local search results. Search systems can save resources by providing local data only for verified local search results.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
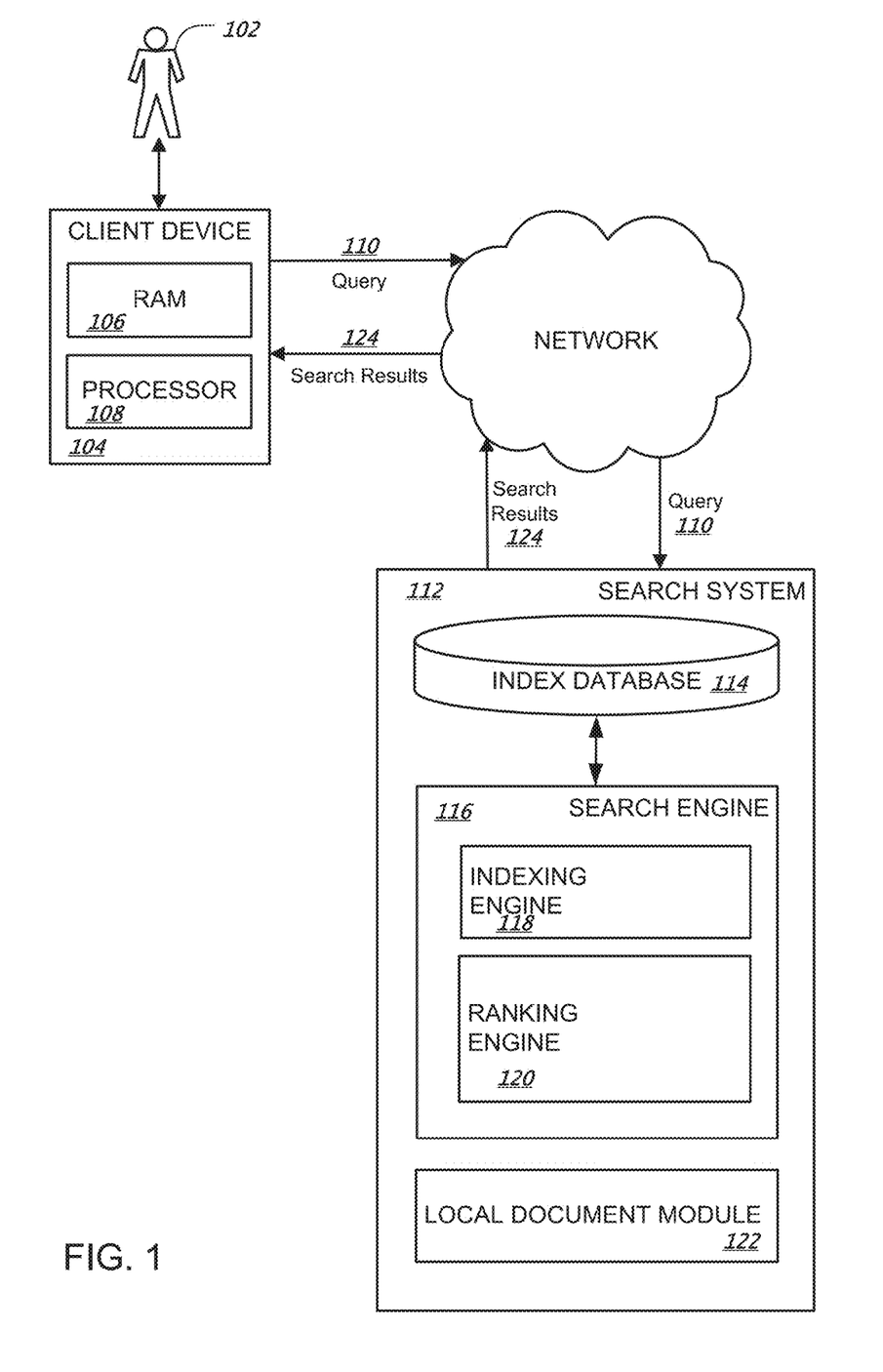
FIG. 1 illustrates an example search system for providing search results responsive to submitted queries.

FIG. 1 illustrates an example search system 112 for providing search results responsive to submitted queries as can be implemented in an internet, an intranet, or another client and server environment. The search system 112 is an example of an information retrieval system in which the systems, components, and techniques described below can be implemented.

A user 102 can interact with the search system 112 through a client device 104. For example, the client device 104 can be a computer coupled to the search system 112 through a local area network (LAN) or wide area network (WAN), e.g., the Internet. The client device 104 will generally include a random access memory (RAM) 106 and a processor 108. In some implementations, the search system 112 and the client device 104 can be one machine. For example, a user can install a desktop search application on the client device 104. In some implementations, the search system 112 can be implemented as, for example, computer programs running on one or more computers in one or more locations that are coupled to each other through a network.

A user 102 can submit a query 110 to search system 112. The query 110 can be submitted to search engine 116 by different methods. For example, user 102 can interact with a user interface device associated with client device 104 to submit the query 110. The user interface device can be any input device (e.g., keyboard, mouse, touch display device) that allows user 102 to enter query 110 into a graphical user interface of search system 112. Other methods of submitting queries to search engine 116 can also be performed. For example, user 102 can submit the query by speaking the query 110. An audio input device associated with client device 104 will detect the query 110 and transmit the query 110 through a network to search system 112.

The search system 112 includes a search engine 116, an index database 114, and a local document module 122.

Search engine 116 identifies resources that match query 110. The search engine 116 can be, for example, an Internet search engine that takes action or identifies answers based on user queries, a question and answer system that provides direct answers to questions posed by the user, or another system that processes user requests. The search engine 116 will generally include an indexing engine 118 and a ranking engine 120. Indexing engine 118 processes and updates resources, e.g., documents, web pages, images, or news articles on the Internet, found in a corpus, e.g., a collection or repository of content, in index database 114 using conventional or other indexing techniques.

The ranking engine 120 uses the index database 114 to identify documents responsive to the query 110, for example, using conventional or other information retrieval techniques. The ranking engine 120 calculates scores for the documents responsive to the query, for example, using one or more ranking signals. Each signal provides information about the document itself or the relationship between the document and the query. One example signal is a measure of the overall quality of the document. Another example signal is a measure of the number of times the terms of the query occur in the document. Other signals can also be used. The ranking engine 120 then ranks the responsive documents using the scores.

The search system 112 uses the documents identified and scored by the ranking engine 116 to generate search results 124. The search results 124 include results corresponding to documents responsive to the query 110. For example, a result can include a title of a document, a link to the document, and a summary of content from the document that is responsive to the query. Other examples of results 124 include a summary of information responsive to the query. The summary can be generated from documents responsive to the query or from other sources. The search results 124 can be transmitted through the network to the client device 104 in a form that can be presented to the user 102.

Local document module 122 determines that certain documents identified by the search engine 116 in response to query 110 are candidate local documents. The candidate local documents are verified as local documents, as described in more detail below with reference to FIG. 3. Local document module 122 causes local data associated with the verified local documents to be transmitted with search results 124 to be presented to user 102. While the local document module 122 is depicted as a component within search system 112, the local document module 122 can also be implemented as, for example, computer programs running on one or more computers outside search system 112 and communicatively coupled with search system 112 through a network.

Figure 2A:
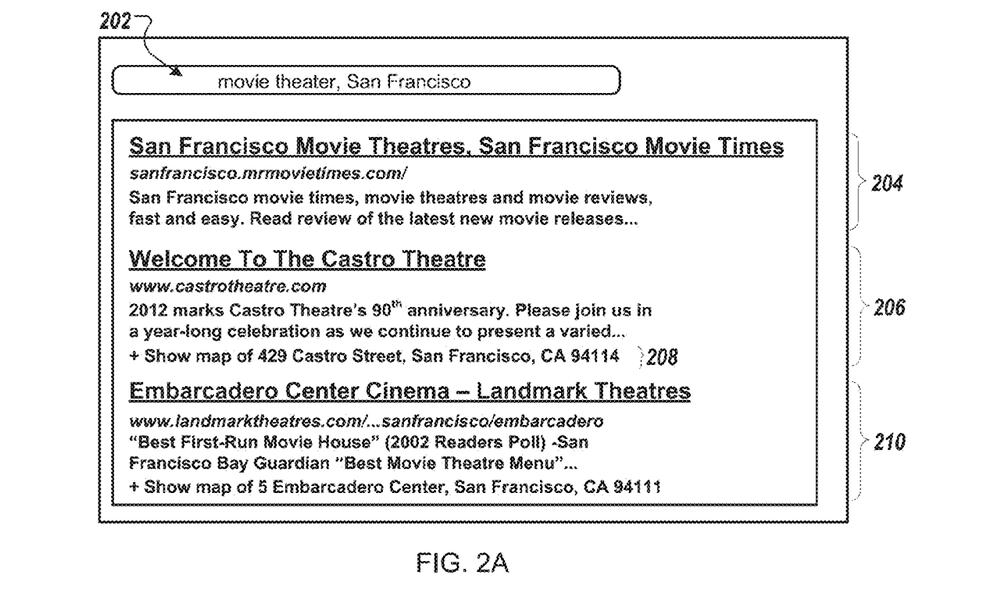
FIGS. 2A and 2B illustrate example graphical user interfaces displaying search results in response to a query.
Figure 2B:
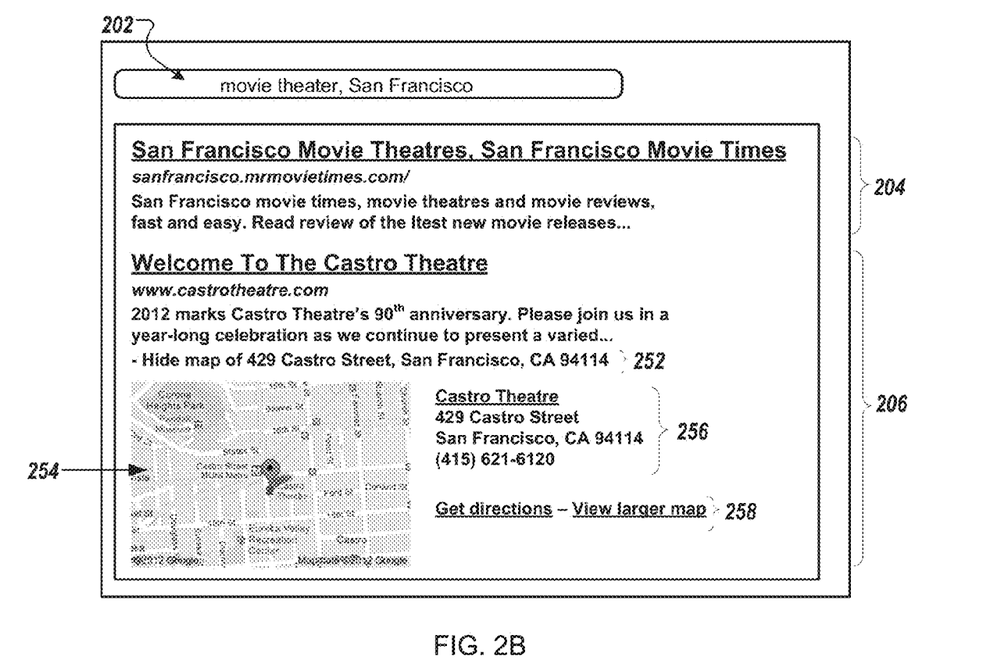

FIGS. 2A and 2B illustrate example graphical user interfaces displaying search results in response to a query.

In FIG. 2A, the query "movie theatre, San Francisco" 202 is submitted to a search system through the graphical user interface. In response to the submitted query 202, the search system generates search results that satisfy query 202 and causes the search results to be presented to the user. FIG. 2A illustrates search results 204, 206, and 210 presented in the graphical user interface viewed by a user. The user can interact with the graphical user interface to scroll through the presented search results to see additional search results for the query.

Each search result is represented in the graphical user interface by a title of the document that corresponds to the search result, a URL for the document, and a summary of content in the document. For example, for search result 204, the displayed title is "San Francisco Movie Theatres, San Francisco Movie Times," the displayed URL is "sanfrancisco.mrmovietimes.com/," and the displayed summary of content is "San Francisco movie times, movie theatres and movie reviews, fast and easy. Read review of the latest new movie releases." Other information related to a search result can also be displayed. The title can be anchor text that links the user directly to the document when selected.

The search system can determine that certain generated search results correspond to candidate local documents. The search system can verify that these candidate local documents are local documents, as described below in reference to FIG. 3. Local data associated with the verified local documents is presented with their respective search results. In FIG. 2A, search results 206 and 210 are illustrated as local search results that correspond to verified local documents. Local data is presented for search results 206 and 210. For example, for search result 206, information describing a location associated with the document that corresponds to search result 206 is presented. This information is presented in the form of an answer box, "+Show map of 429 Castro Street, San Francisco, Calif., 94114" 208.

FIG. 2B illustrates a change in the graphical user interface in response to a user interaction with answer box 208 in FIG. 2A. In response to the user interaction with answer box 208 for search result 206, search result 206 expands in the graphical user interface to present additional local data. The expansion of the search result 206 in the graphical user interface causes search result 210 to be moved out of view in the graphical user interface. The additional local data includes a map 254 of the location associated with search result 206. The additional local data further includes business information 256 for a business associated with search result 206. For example, the business information can include a business name "Castro Theatre," a business address "429 Castro Street, San Francisco, Calif., 94114," and a business phone number "(415) 621-6120." The user can interact with business information 256 to produce additional actions. For example, the user can interact with the business name to pull up a place page for the business. Alternatively, or additionally, the user can interact with the business phone number to initiate a phone call to the business phone number.

Additional links 258 can be provided in the expanded view of search result 206. For example, a "Get directions" link can be provided that links the user to a map/routing service that provides directions to the business address. Additionally, or alternatively, a "View larger map" link can be provided that links the user to a web page containing a larger view of map 254.

Users can interact with answer box "—Hide map of 429 Castro Street, San Francisco, Calif. 94114" 252 to cause the additional local data 254, 256, and 258 to be hidden from view.

Figure 3:
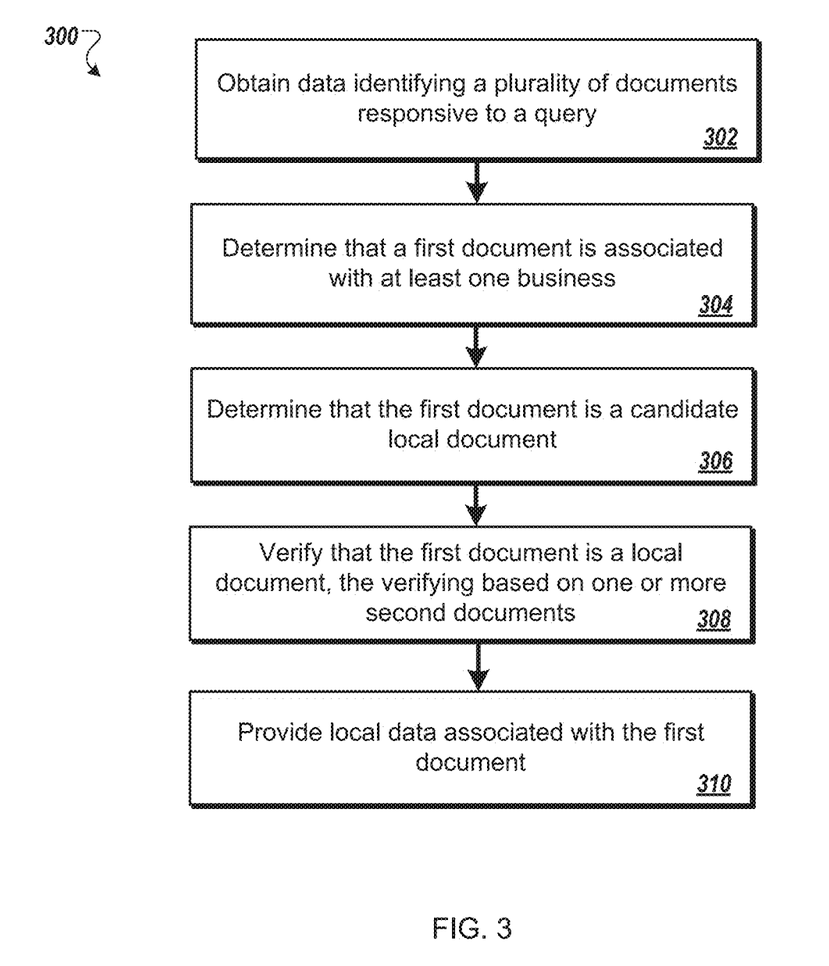
FIG. 3 illustrates an example method for providing local data associated with search results.

FIG. 3 illustrates an example method for providing local data associated with search results. For convenience, the example method 300 will be described in reference to a system that performs method 300. The system can be, for example, the local document module 122 described above with reference to FIG. 1. In some implementations, the system can be one or more computers.

The system obtains data identifying documents responsive to a query (302). For example, the system can obtain documents identified by a search engine in response to the query, as described above with reference to FIG. 1.

The system determines that a first document is associated with at least one business (304). In some implementations, the system can determine that a first document is associated with at least one business using data describing the association between documents and businesses. For example, the system can obtain this data from a business listing database, e.g., over a network. The business listing database contains entries for electronic documents on the internet. Each entry represents an electronic document and contains information about businesses that are associated with the respective electronic document. The system attempts to match the first document with a document entry in the business listing database. If a match is found, the system then attempts to identify at least one business associated with the document in the matched document entry. If the system is able to identify at least one business in the matched document entry, then the system determines that the first document is associated with a business. If no document match is found, or the matched document entry contains no associated business listings, then the system takes no further action for the first document.

In some implementations, the business listing database is maintained, utilizing a method which may be implemented algorithmically, by analyzing documents to identify references to businesses in the documents. If the method determines there to be one or more businesses that are referenced in a document, the businesses are stored in the database entry for the document. Additional information may be stored for each business stored in a document entry in the business listing database. For example, business information, e.g., name, address, phone number, can be stored with each business.

In some implementations, the business listing database further categorizes businesses associated with a document. For example, businesses can be categorized as authoritative businesses. The same method used to analyze documents to identify references to businesses in documents, or a different method, may be used to determine if a referenced business in a document is an authoritative business. The method categorizes a business as an authoritative business when the document the business is associated with is an official document for the business, e.g., the official web-site for the business. If a business is determined to be an authority business for a document, the business is stored as an authority business in the respective document entry in the business listing database. For example, the method will identify Home Depot as an authority business upon analyzing the document identified by URL www.homedepot.com. Home Depot will be stored as an authoritative business in the business listing database entry for the document identified by URL www.homedepot.com.

Businesses can also be categorized as topical businesses in the business listing database. The same method used to analyze documents to identify references to businesses in documents, or a different method, may be used to determine if a referenced business in a document is a topical business. The method categorizes a business as a topical business when the business is a topical subject of the document the business is associated with. If a business is determined to be a topical business for a document, the business is stored as a topical business in the respective document entry in the business listing database. For example, the method will identify Per Se as a topical business upon analyzing a document that contains a critic's review of Per Se. Per Se will be stored as a topical business in the business listing database entry for the document containing the critic's review of Per Se.

Businesses can also be categorized as chain stores in the business listing database. Businesses stored in document entries in the business listing database can be matched with a database of known chain stores or list of businesses that are known chain stores. Business in the business listing database that match known chain stores are categorized as chain stores.

The system determines that the first document is a candidate local document (306). In some implementations, the first document is determined to be a candidate local document if the first document is associated with only one business, e.g., not with multiple businesses. The system can determine the number of businesses associated with the document from the business listing database described above.

In some implementations, the first document is determined to be a candidate local document if the first document is associated with an authority business or a topical business. Authority business and topical business information for a document can be obtained from the business listing database described above. The system determines that the first search result is associated with an authority business or a topical business by matching the first document with a document entry in the business listing database and determining that the document entry contains a business that is categorized as an authority business or topical business.

In some implementations, the first document is determined to be a candidate local document if the first document is associated with a chain store. Chain store information for a document can also be obtained from the business listing database described above. The system determines that the first document is associated with a chain store by matching the first document with a document entry in the business listing database and determining that a business categorized as a chain store is stored in the document entry. Alternatively, the system can determine that a business associated with a document is a chain store from a database of known chain stores.

In some implementations, the chain store associated with the first document has to be within a predetermined distance from the user that submitted the original query for the first document to be a candidate local document. The address of the chain store can be obtained from either the business listing database or chain store database. A geo-location associated with the user can be obtained and compared with business address of the chain store. If the chain store is within a predetermined distance of the geo-location associated with the user, the document associated with the chain store is determined to be a candidate local document.

The system verifies that the first document is a local document based on one or more second documents of the documents responsive to the query (308). The system verifies the document by determining that there is a relationship between the one or more second search documents and the first document. In some implementations, the relationship is that the one or more second documents reference the first document. For example, the system can determine that a second document references the first document if the second document contains a reference to the first document. The reference can be a title or description of the first document. As another example, the system can use other types of references to determine if a second document references the first document. For example, anchor text, hyperlinks, and URLs in the second document that point to the first document can be used to determine that the second document references the first document.

In some implementations, the one or more second search documents are documents identified as most responsive to the query. The system verifies that the first document is a local document based on second documents identified from the plurality of documents responsive to the query that are the most responsive to the query. For example, the plurality of documents responsive to the query can be ranked by the ranking engine according to a score, as described above with reference to FIG. 1. The top n-ranked documents can be identified as second documents, where n can be any integer number, that can be used to verify the first document as a local document.

In some implementations, at least a threshold number of second documents must reference the first document for the system to verify the first document as a local document. For example, if the threshold number is n, where n is any positive integer, the first document is verified as a local document if at least n second documents reference the first document. If less than n second documents reference the first document, then the system takes no further action on the first document.

The system provides local data associated with the first document (310). After the first document has been verified as a local document, the system obtains local data associated with the first document. The local data can be for businesses associated with the first document. The local data can be obtained from a database of business listings, such as the business listing database or chain store database described above. In some implementations, the local data can be directly transmitted to the user device simultaneously with the search results for the query. Alternatively, the local data can be transmitted to the user device after transmittal of the search results. In some implementations, the local data can be provided to the search engine. The search engine can include the local data with the search results for the query and transmit the search results and local data to the user device. The local data is presented to the user. The local data can be presented with the search result that corresponds to the first document in the graphical user interface of the search engine.

The local data can describe business information for the business associated with the first document. For example, the business information can include a business name, business address, and/or a business phone number for the business associated with the first document.

The local data can be presented to the user in the form of an answer box, as illustrated by answer box 208 in FIG. 2A. The answer box can include text that describes the local data obtained by the system. The text can describe all or certain portions of the local data obtained by the system. For example, if the system provides a business name, business address, and a business phone number, the text can describe only the business address, as illustrated by answer box 208 in FIG. 2A.

The answer box can be an interactive element. The answer box can indicate to users that it is an interactive element by describing an action that will result in response to a user interaction with the answer box. For example, if the answer box describes a business address, the answer box text can include the words "Show map of" followed by the business address. As a further example, if the answer box describes a business phone number, the answer box text can include the word "Call" followed by the business phone number.

A user can interact with the answer box by selecting the answer box. The answer box can be selected by a cursor in the graphical user interface of the search engine. The cursor can be controlled by a user interface associated with user device, such as a mouse or touch screen. A user can interact with answer boxes by other methods. For example, a user can cause a cursor in the graphical user interface of the search engine to hover over the answer box. A user interaction with the answer box can cause the action described in the answer box to be performed. For example, if a user interacts with an answer box the includes the word "Call" followed by a phone number for a business associated with the document, the interaction will cause a phone call to be initiated with the phone number. Additionally, or alternatively, a user interaction with the answer box can cause the answer box to expand to display additional information for the first document. For example, if a user interacts with an answer box that includes the word "Show map of" followed by a business address associated with the first document, the search result that corresponds to the first document can expand to display additional information related to the first document. In some implementations, a map of the address for the business associated with the document can be presented. Additionally, or alternatively, additional local data for the business associated with the first document can be presented. For example, the business name, the business address, and the business phone number obtained by the system can be presented. A user can further interact with this information as described above with reference to FIG. 1.

In some implementations, the system can verify multiple documents responsive to the query as local documents. The system can obtain local data for one or more of the verified local documents. Local data for a plurality of verified local documents can be provided with their respective search results, as described above.

An electronic document, which for brevity will simply be referred to as a document, may, but need not, correspond to a file. A document may be stored in a portion of a file that holds other documents, in a single file dedicated to the document in question, or in multiple coordinated files.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
receiving a search query;
identifying resources that a search engine indicates are responsive to the search query;
for each of the resources that are identified as responsive to the search query, determining whether content of the resource that is identified as responsive to the search query includes a reference to a single business;
in response to determining content of a resource that is identified as responsive to the search query includes a reference to a single business, classifying the resource as a local resource for which a local search result format including geographical location information for the single business is to be used in generating a corresponding search result;
in response to determining content of a resource that is identified as responsive to the search query does not include a reference to a single business, classifying the resource as a non-local resource for which a default search result format, that is different than the local search result format that includes geographical location information for the single business, is to be used for generating a corresponding search result;
generating a search results page including a corresponding search result for each of the identified resources, comprising: (i) formatting a corresponding search result for each of the resources that are classified as local resources according to the local search result format, and (ii) formatting a corresponding search result for each of the resources that are classified as non-local resources according to a default search result format that is different than the local search result format; and
providing the search results page for output in response to the search query.

2. The method of claim 1, wherein determining whether content of the resource that is identified as responsive to the search query includes a reference to a single business comprises:
determining whether the content of the resource includes a name of the single business; and
in response to determining that the content of the resource includes a name of the single business, determining that the resource is associated with the single business.

3. The method of claim 1, wherein classifying the resource as a local resource for which a local search result format is to be used in generating a corresponding search result comprises:
determining that the content of the resource references a business that includes chain stores;
in response to determining that the content of the resource references a business that includes chain stores, determining whether a distance of a user from the closest chain store of the business is within a predetermined distance; and
in response to determining that the distance of the user from the closest chain store of the business is within the predetermined distance, classifying the resource as a local resource for which the local search result format is to be used for generating a corresponding search result.

4. The method of claim 1, wherein classifying the resource as a local resource for which a local search result format is to be used in generating a corresponding search result comprises:
determining whether the other resources include content that reference the resource; and
in response to determining that the other resources include content that reference the resource, classifying the resource as a local resource for which a local search result format is to be used in generating a corresponding search result.

5. The method of claim 4, wherein determining whether the other resources include content that reference the resource comprises:
determining whether the other resources include content that include a title of the resource, a description of the resource, or a universal resource locator pointing to the resource.

6. The method of claim 4, wherein determining whether the other resources include content that reference the resource comprises:
determining whether a predetermined number of the other resources include content that reference the resource.

7. The method of claim 1, wherein the local search result format includes a graphical interface element that is selectable to display an address of the single business and the default search result format does not include the graphical interface element.

8. A system comprising:
one or more computers and one or more storage devices storing instructions that are operable, when executed by the one or more computers, to cause the one or more computers to perform operations comprising:
receiving a search query;
identifying resources that a search engine indicates are responsive to the search query;
for each of the resources that are identified as responsive to the search query, determining whether content of the resource that is identified as responsive to the search query includes a reference to a single business;
in response to determining content of a resource that is identified as responsive to the search query includes a reference to a single business, classifying the resource as a local resource for which a local search result format including geographical location information for the single business is to be used in generating a corresponding search result;
in response to determining content of a resource that is identified as responsive to the search query does not include a reference to a single business, classifying the resource as a non-local resource for which a default search result format, that is different than the local search result format that includes geographical location information for the single business, is to be used for generating a corresponding search result;
generating a search results page including a corresponding search result for each of the identified resources, comprising: (i) formatting a corresponding search result for each of the resources that are classified as local resources according to the local search result format, and (ii) formatting a corresponding search result for each of the resources that are classified as non-local resources according to a default search result format that is different than the local search result format; and
providing the search results page for output in response to the search query.

9. The system of claim 8, wherein determining whether content of the resource that is identified as responsive to the search query includes a reference to a single business comprises:

determining whether the content of the resource includes a name of the single business; and in response to determining that the content of the resource includes a name of the single business, determining that the resource is associated with the single business.

10. The system of claim 8, wherein classifying the resource as a local resource for which a local search result format is to be used in generating a corresponding search result comprises:

determining that the content of the resource references a business that includes chain stores;

in response to determining that the content of the resource references a business that includes chain stores, determining whether a distance of a user from the closest chain store of the business is within a predetermined distance; and in response to determining that the distance of the user from the closest chain store of the business is within the predetermined distance, classifying the resource as a local resource for which the local search result format is to be used for generating a corresponding search result.

11. The system of claim 8, wherein classifying the resource as a local resource for which a local search result format is to be used in generating a corresponding search result comprises:

determining whether the other resources include content that reference the resource; and in response to determining that the other resources include content that reference the resource, classifying the resource as a local resource for which a local search result format is to be used in generating a corresponding search result.

12. The system of claim 11, wherein determining whether the other resources include content that reference the resource comprises:

determining whether the other resources include content that include a title of the resource, a description of the resource, or a universal resource locator pointing to the resource.

13. The system of claim 11, wherein determining whether the other resources include content that reference the resource comprises:

determining whether a predetermined number of the other resources include content that reference the resource.

14. The system of claim 8, wherein the local search result format includes a graphical interface element that is selectable to display an address of the single business and the default search result format does not include the graphical interface element.

15. A non-transitory computer-readable medium storing software comprising instructions executable by one or more computers which, upon such execution, cause the one or more computers to perform operations comprising:

receiving a search query;

identifying resources that a search engine indicates are responsive to the search query;

for each of the resources that are identified as responsive to the search query, determining whether content of the resource that is identified as responsive to the search query includes a reference to a single business;

in response to determining content of a resource that is identified as responsive to the search query includes a reference to a single business, classifying the resource as a local resource for which a local search result format including geographical location information for the single business is to be used in generating a corresponding search result;

in response to determining content of a resource that is identified as responsive to the search query does not include a reference to a single business, classifying the resource as a non-local resource for which a default search result format, that is different than the local search result format that includes geographical location information for the single business, is to be used for generating a corresponding search result;

generating a search results page including a corresponding search result for each of the identified resources, comprising: (i) formatting a corresponding search result for each of the resources that are classified as local resources according to the local search result format, and (ii) formatting a corresponding search result for each of the resources that are classified as non-local resources according to a default search result format that is different than the local search result format; and providing the search results page for output in response to the search query.

16. The medium of claim 15, wherein determining whether content of the resource that is identified as responsive to the search query includes a reference to a single business comprises:

determining whether the content of the resource includes a name of the single business; and in response to determining that the content of the resource includes a name of the single business, determining that the resource is associated with the single business.

17. The medium of claim 15, wherein classifying the resource as a local resource for which a local search result format is to be used in generating a corresponding search result comprises:

determining that the content of the resource references a business that includes chain stores;

in response to determining that the content of the resource references a business that includes chain stores, determining whether a distance of a user from the closest chain store of the business is within a predetermined distance; and in response to determining that the distance of the user from the closest chain store of the business is within the predetermined distance, classifying the resource as a local resource for which the local search result format is to be used for generating a corresponding search result.

* * * * *